Patented Mar. 21, 1933

1,902,102

UNITED STATES PATENT OFFICE

OTTO SCHMID, OF ROTTWEIL-ON-THE-NECKAR, GERMANY, ASSIGNOR TO I. G. FARBENINDUSTRIE AKTIENGESELLSCHAFT, OF FRANKFORT-ON-THE-MAIN, GERMANY

MANUFACTURE OF VISCOSE

No Drawing. Application filed November 27, 1929, Serial No. 410,262, and in Germany December 3, 1928.

My present invention relates to a process of manufacturing a viscose solution as used in the industry dealing with the manufacture of artificial threads or films. More particularly, it relates to a process which may be carried out in a continuous operation in a very short time without altering the quality of the spinning solution obtained.

The whole crux of my invention can well be exemplified by brief discussion of the prior art. Hitherto, the viscose has been generally produced in separate operations by immersing the cellulose into a caustic lye, removing the excess of liquid, subsequently freeing the alkali cellulose of fibers, sulfidizing it with carbon disulfide and dissolving the cellulose xanthogenate thus obtained in a dilute solution of an alkali metal hydroxide. If necessary, the viscose has been allowed to mature for some days.

Attempts have been made to produce a viscose solution ready for use in a much shorter time by treating cellulose with an alkali metal hydroxide solution of up to 12 per cent strength by sulfidizing the alkali cellulose with a limited quantity of carbon disulfide and dissolving it; however, in these processes it is necessary to apply at any step during the working operation a low temperature of 0 to $-15°$ C. It is obvious that the manufacture in this way is considerably more expensive by application of the said cooling operations.

According to my present invention a completely clear viscose solution is obtainable within a few hours by alkalizing, sulfidizing and dissolving the cellulose in a continuous operation at room temperature and if necessary, in the same vessel.

A chief feature of my invention is that the mixture of cellulose and caustic alkali solution containing no more than 25 per cent of cellulose, as for instance, 18 per cent of cellulose is sulfidized directly without any removal of liquid. The sulfidized mass may be diluted to the desired cellulose content and to the required viscosity.

Preferably, I prepare the alkali cellulose by the action of a lye containing about 18 per cent of sodium hydroxide. Lyes of higher or lower concentrations may be used, care being taken, however, that the concentration of the lye is not less than 12 per cent and that the quantity of cellulose does not surpass 25 per cent of the mixture.

My new process has the following advantages over those hitherto known. All operations can be performed at room temperature and if necessary, in the same vessel, so that the cost of upkeep of the apparatus is reduced and but few operations are necessary. The time of finishing the viscose solution is restricted to a few hours. Waste of lye does not occur.

Furthermore, the viscosity of the finished viscose may be altered within wide limits by my process by choosing the suitable concentration of the lye in preparing the alkali cellulose.

As a starting material I may use any cellulose, as for instance, sulfite cellulose, cotton, cotton linters or $\alpha$-fibers.

The following examples illustrate my invention, the parts being by weight:—

*Example 1.*—100 parts of sulfite cellulose as generally used in the manufacture of artificial silk are mixed at room temperature in a mixing machine with 660 parts of caustic soda solution of 19 per cent strength. As soon as the mixture has become a homogeneous mass (that is for instance, after ½ hour) 65 parts of carbon disulfite are added. The mixture is well stirred for about 2 to 2½ hours at room temperature. After this time, an unobjectionable solution is obtained which may be diluted with water to a solution containing 4 per cent of cellulose. It shows in the ball viscosimeter a viscosity of 15 seconds. The viscosity is determined by measuring in seconds the time in which a polished steel ball of 0.1105 grams weight and of a diameter of 3 mm. falls through a column of 20 cm. height of the viscose freed from air bubbles, and kept at a temperature of 20° C.

*Example 2.*—660 parts of caustic soda solution of 19 per cent strength used in Example 1, are substituted by 1045 parts of a caustic soda solution of 12 per cent strength. The mixture is well stirred until it forms a homogeneous magma which is sulfidized and finished under the conditions given in Example 1. By dilution, a viscose of the same composition as in Example 1 is produced showing, however, a viscosity of 50 seconds in the ball viscosimeter.

*Example 3.*—100 parts of cellulose as generally used in the artificial silk industry, as for instance sulfite cellulose, cotton, cotton linters, or α-fibers are mixed in a mixing machine with 350 parts of caustic soda solution of 22 per cent strength until a homogeneous mass is formed. Then 38 to 40 parts of carbon disulfide are added and while stirring for about 2 hours, the cellulose is completely sulfidized. A thickly liquid viscose is obtained which is diluted with water and caustic soda solution to the desired cellulose and alkali contents. Thus, for instance, a spinning solution containing 6 per cent of cellulose and 6.5 per cent of alkali is obtainable which may be allowed to mature for 20 to 36 hours.

What I claim is:—

1. A process for manufacturing viscose in a continuous operation which comprises sulfidizing with carbon disulfide a mixture of cellulose with an alkali metal hydroxide solution, said mixture containing at most 25 per cent of cellulose and said alkali metal hydroxide solution having a concentration of at least 12 per cent until a concentrated viscose solution is formed, and diluting said viscose solution with water, all these different operations being carried out at ordinary temperature.

2. A process for manufacturing viscose in a continuous operation which comprises sulfidizing with carbon disulfide a mixture of cellulose with an alkali metal hydroxide solution, said mixture containing at most 25 per cent of cellulose and said alkali metal hydroxide solution having a concentration of at least 12 per cent until a concentrated viscose solution is formed, and diluting said viscose solution with water and alkali metal hydroxide solution to a viscose in which the ratio cellulose to alkali is 6:6.5, all these operations being carried out at ordinary temperature.

3. A process of manufacturing viscose in a continuous operation which comprises sulfidizing with carbon disulfide a mixture of cellulose with an alkali metal hydroxide solution, said mixture containing at most 25 per cent of cellulose and said alkali metal hydroxide solution having a concentration of at least 12 per cent until a concentrated viscose solution is formed, and diluting said viscose solution with water and alkali metal hydroxide solution to a viscose in which the ratio cellulose to alkali is 6:6.5, all these operations being carried out at ordinary temperature and in the same vessel.

4. A process for manufacturing viscose in a continuous operation which comprises preparing a homogeneous mixture of 100 parts of cellulose and 660 parts of caustic soda solution of 19 per cent strength, adding 65 parts or carbondisulfide, stirring the mixture until a concentrated viscose solution is formed and diluting said viscose solution with water, all these operations being carried out at ordinary temperature.

In testimony whereof, I affix my signature.

OTTO SCHMID.